United States Patent [19]

Brehm et al.

[11] Patent Number: 5,617,890
[45] Date of Patent: Apr. 8, 1997

[54] ELECTROMAGNETICALLY OPERABLE PRESSURE-REGULATION VALVE

[75] Inventors: Werner Brehm, Hemmingen; Walter Fleischer, Stuttgart, both of Germany

[73] Assignee: Robert Bosch GmbH, Stuttgart, Germany

[21] Appl. No.: 476,273

[22] Filed: Jun. 7, 1995

[30] Foreign Application Priority Data

Sep. 3, 1994 [DE] Germany ............... 44 31 457.4

[51] Int. Cl.⁶ ............... F15B 13/044; F16K 31/06
[52] U.S. Cl. ............... 137/82; 251/129.14; 251/129.16
[58] Field of Search ............... 137/82, 625.61; 251/129.14, 129.16

[56] References Cited

U.S. PATENT DOCUMENTS

| | | | |
|---|---|---|---|
| 2,983,278 | 5/1961 | Heintz | 137/82 |
| 4,567,910 | 2/1986 | Slavin et al. | 137/82 |
| 4,850,384 | 7/1989 | Cook | 251/129.16 X |
| 5,065,979 | 11/1991 | Detweiler et al. | 251/129.16 |
| 5,240,227 | 8/1993 | Sich | 251/129.16 |

*Primary Examiner*—Gerald A. Michalsky
*Attorney, Agent, or Firm*—Michael J. Striker

[57] ABSTRACT

An electromagnetically operable pressure-regulating valve is proposed, in whose valve connection element (40) there is configured a choke bore (57, 57a to 57c). The choke bore (57, 57a to 57c), which operates hydraulically like a choke, facilitates the balancing of the pressure-regulating valve in the hydraulic system and produces a characteristic curve of the pressure-regulating valve which is virtually temperature-independent.

1 Claim, 2 Drawing Sheets

ELECTROMAGNETICALLY OPERABLE PRESSURE-REGULATION VALVE

BACKGROUND OF THE INVENTION

The present invention relates to an electromagnetically operable pressure-regulating valve.

More particularly, it relates to an electromagnetically operable pressure-regulating valve having a magnet part with a magnet housing accommodating a magnet coil and an armature connected with a ram, and a valve connection element connected to the magnet part and having a wall provided with a duct for controlling a pressure medium and a valve seat cooperating with a valve element operable by the ram. In pressure-regulating valves of this type which are used in practice, in the pressure line leading to the pressure-regulating valve there is disposed an orifice plate. The orifice plate is usually configured in the form of an apertured orifice having a punched hole. The pressure-regulating valve which is used, for example, in automatic transmissions of motor vehicles regulates the pressure-medium current to a consumption unit in a bridge circuit with the orifice plate. A drawback in this is that dimensional and variances in dimensions and shape, resulting, for example, from wear to the punching die for the apertured orifice plate, alter the flow coefficient of the orifice plate. Consequently, the characteristic curve of the pressure-regulating valve, in particular the position and curvature thereof, is also influenced by the altered influx conditions. A further drawback is that, as the temperature falls or the oil viscosity increases, the hydraulic resistance of the orifice plate remains relatively constant. On the other hand, the laminar component of the hydraulic resistance at the valve seat in the pressure-regulating valve increases with falling temperature. These differences in resistance behavior in the event of temperature differences between the orifice plate and the valve seat lead to a variance in the characteristic curve of the pressure-regulating valve, which variance manifests itself in the so-called "residual pressure behavior". If the residual pressure is too high, this can result in operating disturbances in the consumption unit controlled by the pressure-regulating valve.

SUMMARY OF THE INVENTION

Accordingly, it is an object of the present invention to provide an electromagnetically operable pressure-regulating valve, which avoids the disadvantages of the prior art.

In keeping with these objects and with others which will become apparent hereinafter, one feature of the present invention resides, briefly stated, in an electromagnetically operable pressure-regulating valve having a magnet part with a magnet housing accommodating a magnet coil and an armature connected with a ram, and a valve connection element connected to the magnet part and having a wall provided with a duct for controlling a pressure medium and a valve seat cooperating with a valve element operable by the ram, wherein in accordance with the present invention a flow element is disposed between a pressure medium source and a valve seat and is arranged integrally within the valve connection element.

When the electromagnetically operable pressure-regulating valve is designed in accordance with the present invention, it has the advantage over the above that the characteristic curve of the pressure-regulating valve, even in the installed state within the hydraulic system, is always relatively exact. The integrated configuration of the flow element within the plastic valve connection element means that any desired geometric forms of the flow element are able to be obtained with little effort. Of particular advantage is the fact that the characteristic curve of the pressure-regulating valve is virtually temperature-independent.

In accordance with another feature of the present invention, the flow element can be configured as a choke bore. The choke bore can have cross-sectional areas of polygonal configuration, and also the choke bore can have a plurality of regions having different cross-sectional areas.

The valve connection element can be composed of a plastic material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

PREFERRED EMBODIMENTS

Figure 1:
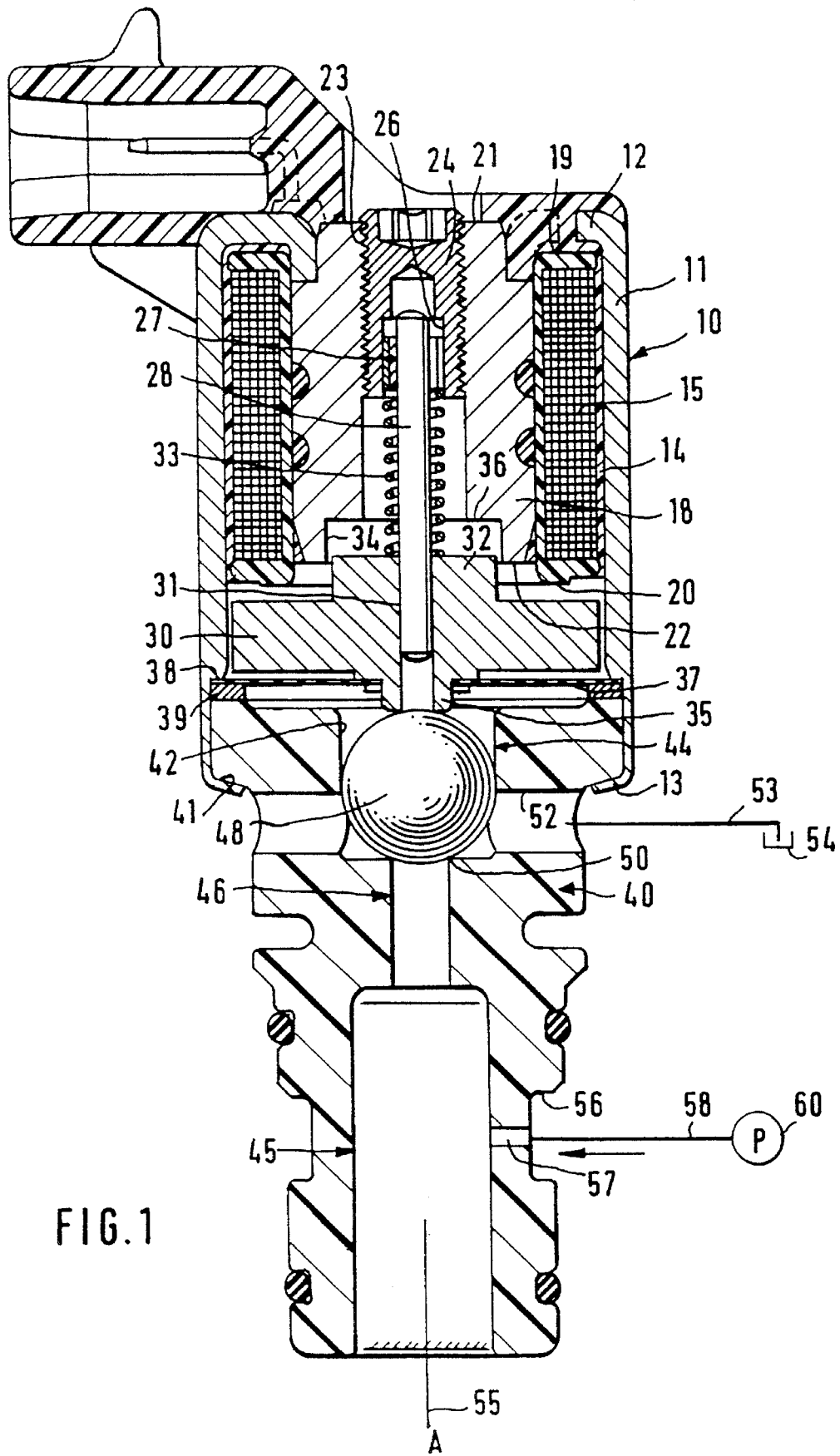
FIG. 1 shows an electromagnetically operable pressure-regulating valve in longitudinal section.

The electromagnetically operable pressure-regulating valve represented in FIG. 1 has a magnet part 10. The magnet part 10 comprises a roughly sleeve-shaped magnet housing 11 having a base 12, which is drawn in in a U-shape, and a beaded edge 13 disposed at the other end. In the interior 14 of the magnet housing 11 there is inserted a magnet coil 15. The magnet coil 15 encloses a sleeve-shaped magnet core 18. The two end faces 19, 20 of the magnet coil 15 terminate roughly with the respective end faces 21, 22 of the magnet core 18.

On the side facing the base 12 of the magnet housing 11, there is inserted in a bore 23 of the magnet core 18 an adjusting screw 24, the length of which corresponds to approximately half the length of the magnet core 18. On the side facing away from the base 12 of the magnet housing 11, there is configured in the adjusting screw 24 a stepped bore 26, in whose region of greater diameter there is inserted a slide bearing 27 for the guidance of a ram 28.

The ram 28 is firmly connected to an armature 30 by being pressed into a bore 31 configured in the armature 30. Against the slide bearing 27 and against the bottom side 32 of the armature 30 there is supported, by the respective end, a helical spring 33, which is guided by the ram 28. The magnet core 18 has, on the side facing the armature 30, a cylindrical recess 34, which is coaxial with the bore 23 and whose floor 36 acts as a stop for a continuation 32 of the armature 30, which continuation is guided in the recess 34.

On the opposite side, there is configured on the armature 30 a step-shaped, cylindrical offset 35. The offset 35 juts into the opening of a diaphragm spring 37, which bears with its outer periphery against a circumferential shoulder 38 in the interior 14 of the magnet housing 11 in the region of the beaded edge 13. With the interposition of a washer 39, the diaphragm spring 37 is adjoined by a plastic valve connection element 40.

The magnet part 10 and the valve connection element 40 are interconnected in a seal-tight arrangement by virtue of the beaded edge 13 of the magnet housing 11 being beaded against a circumferential, drawn-in edge 41 of the valve connection element 40.

In the valve connection element 40 there is configured a continuous, stepped longitudinal bore 42. The longitudinal bore 42 has two portions 44, 45 of greater bore diameter and, disposed therebetween, a portion 46 of smaller bore diameter. In the portion 44 there is guided a spherical valve element 48, which is placed under stress by the offset 35 of the armature 30. The valve element 48 interacts with a valve seat 50, which is configured at the transition region of the two portions 44, 46. In addition, in the portion 44 there is configured a continuous transverse bore 52, which intersects the longitudinal bore 42 and is connected by a return line 53 to a pressureless vessel 54.

The portion 45 of the longitudinal bore 42 is connected by a consumption unit line 55 to a consumption unit A (not represented in greater detail). Roughly in the middle of the portion 45 there is configured in the region of an annular groove 56, transversely to the portion 45, a choke bore 57 which opens into the longitudinal bore 42. The choke bore 57 is connected by means of a pressure line 58 to a pump 60. The length/diameter ratio of the choke bore 57 amounts to at least 2:1. The result of this is that the choke bore 57 acts hydraulically like a choke for a pressure medium.

The electromagnetically operable pressure-regulating valve which has been represented and described regulates, in a manner which is known per se, the pressure-medium current to the consumption unit A (not represented in greater detail) in a bridge circuit with the choke bore 57. During running, an equilibrium is formed at the valve element 48 between the compression force arising from the pressure of the pressure medium acting upon the valve seat 50 and the oppositely directed forces arising from the action of the electromagnet and of the helical spring 33. As a result of this equilibrium, a regulated discharge of pressure medium via the pressure line 58, the choke bore 57, the portions 45 and 46, the open valve seat 50 and the transverse bore 52, as well as the return line 53 to the vessel 54, is enabled. Consequently, the desired pressure of the pressure medium is always present at the consumption unit A.

In order to adjust the characteristic curve of the pressure-regulating valve and balance out production tolerances, the bias on the helical spring 33 is adjustable using the adjusting screw 24. Since there is already configured in the valve connection element 40 the choke bore 57, both the tolerance of the pressure-regulating valve per se and the tolerance of the choke bore 57 can now be balanced by means of the adjusting screw 24, in the very manufacture of the pressure-regulating valve, such that the characteristic curve is no longer dependent upon the intake region on the pump side.

The fact that the valve connection element 40 consists of plastic enables any desired forms of the choke bore 57, which are sensible in terms of flow dynamics, to be easily realized. Quadrilateral or polygonal cross sectional areas of the choke bore 57, or bore portions exhibiting different cross sectional patterns, are, for example, conceivable.

Figure 2:
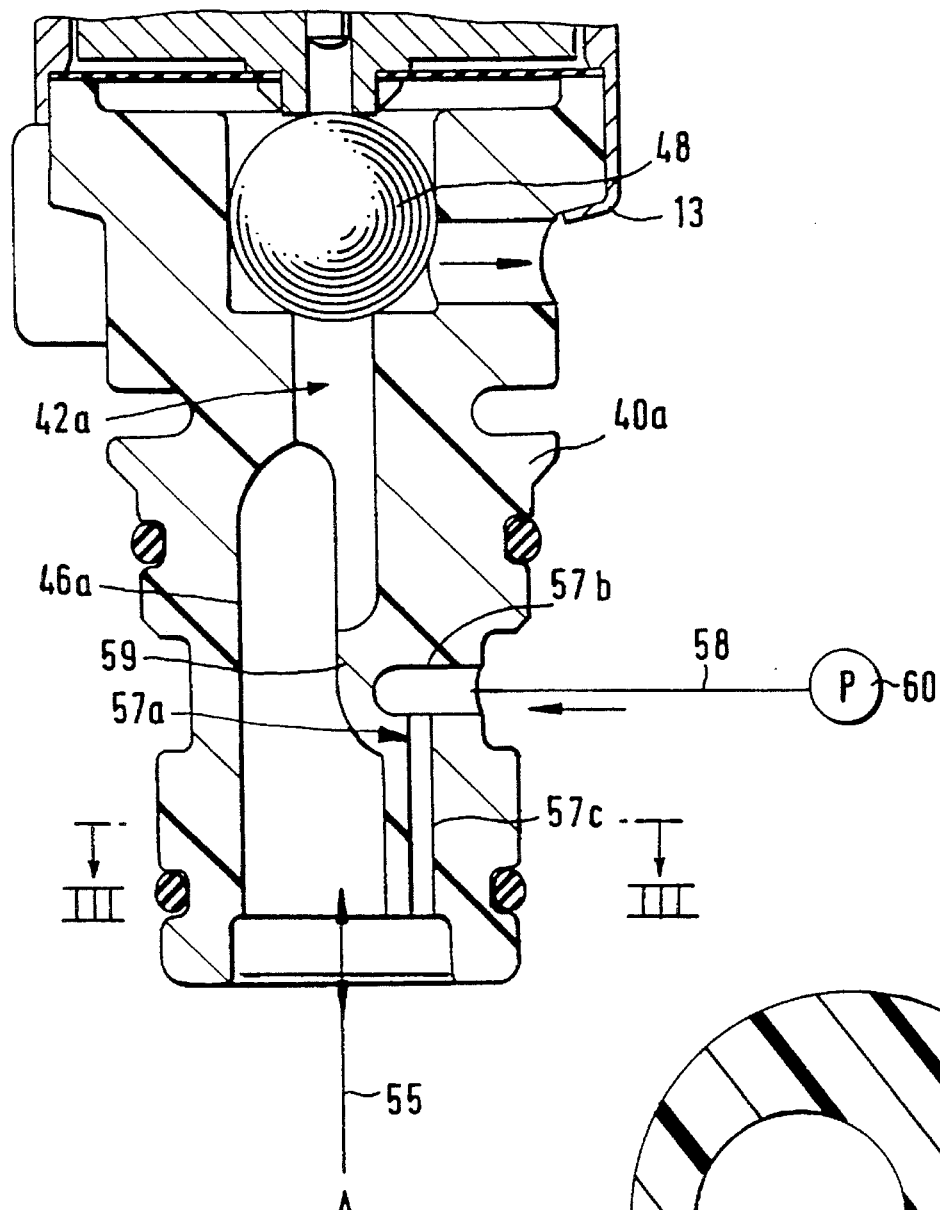
FIG. 2 shows a part of the pressure-regulating valve according to FIG. 1 in modified form in longitudinal section.
Figure 3:
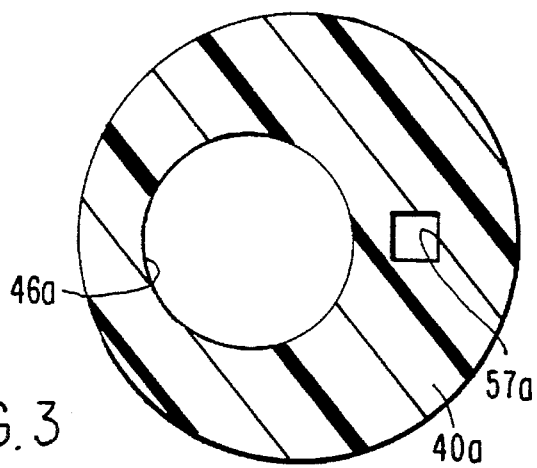
FIG. 3 is a view showing a section of the pressure-regulating valve, taken along the line 3—3 in FIG. 2.

In the illustrative embodiment represented in FIG. 2, the choke bore 57a is extended such that it comprises two portions 57b, 57c, the portion 57c opening transversely into the portion 57b, i.e. running parallel to the longitudinal bore 42a. In order, however, to obtain the same outside diameter of the valve connection element 40a, that portion 46a of the longitudinal bore 42a which runs to the portion 57c is correspondingly matched in cross section, i.e. the portion 46a is constricted in the region of the choke bore 57b by a continuation 59.

The extension of the choke bore 57a, i.e. an increase in the length/diameter ratio and hence an increase in the choke effect, is sensible so as to relieve the "residual pressure". Denoted as residual pressure is the variance in the characteristic curves of the pressure-regulating valve between hot and cold temperatures of the pressure medium, i.e. between different pressure-medium viscosities. The residual pressure behavior can lead to a functional impairment of the consumption unit A connected to the pressure-regulating valve. Marked residual pressure behavior appears in hydraulic systems in which an orifice plate is interposed between the pressure-regulating valve (without choke bore 57) and the pump 60. The residual pressure behavior can be explained in hydraulic systems of this type by the fact that the hydraulic resistance of an orifice plate is virtually independent of the pressure-medium temperature, whereas, at the valve seat, an additional laminar resistance component is obtained at low temperatures. In order to reduce the residual pressure, an additional laminar resistance component must therefore be created in front of the valve seat, so that the pressure obtaining at the valve seat 50 is reduced. This is possible by virtue of a corresponding configuration of the choke bores 57, 57a, e.g. via the length/diameter ratio or their shaping. The characteristic curves of the pressure-medium valve are thus virtually temperature-independent.

By way of addition, it is pointed out that the invention is not limited to a ball seat valve. Instead, slide valves or bevel-seated valves, for example, can also be configured in accordance with the invention.

It will be understood that each of the elements described above, or two or more together, may also find a useful application in other types of constructions differing from the types described above.

While the invention has been illustrated and described as embodied in an electromagnetically operable pressure-regulating valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electromagnetically operable pressure-regulating valve, comprising a magnet part having a housing; a magnet coil with an armature arranged in said magnet housing; a ram connected to said armature; a valve connection element connected to said magnet part and having a wall provided with ducts for a pressure medium to be controlled, said valve connection element having a valve seat; a valve element interacting with said seat; and a flow element disposed between said valve seat and a pressure medium source, said flow element being arranged integrally within said valve connection element, said valve connection element being composed of plastic, said flow element being formed as a choke bore which has a length/diameter ratio amounting to at least 2:1 so as to choke the pressure medium, said choke bore having cross-sectional areas of polygonal shape.

* * * * *